United States Patent
Boss et al.

(10) Patent No.: US 9,229,777 B2
(45) Date of Patent: Jan. 5, 2016

(54) DYNAMICALLY RELOCATING WORKLOADS IN A NETWORKED COMPUTING ENVIRONMENT

(75) Inventors: Gregory J. Boss, Saginaw, MI (US); Christopher J. Dawson, Arlington, VA (US); Rick A. Hamilton, II, Charlottesville, VA (US); Brian M. O'Connell, RTP, NC (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 13/204,910

(22) Filed: Aug. 8, 2011

(65) Prior Publication Data
US 2013/0041989 A1 Feb. 14, 2013

(51) Int. Cl.
G06F 15/173 (2006.01)
G06F 9/50 (2006.01)

(52) U.S. Cl.
CPC .............. *G06F 9/5044* (2013.01); *G06F 9/505* (2013.01)

(58) Field of Classification Search
CPC .......... G06F 2209/503; G06F 11/3442; G06F 3/0631; G06F 9/5055; G06F 9/5083; H04L 67/1004; H04L 67/1021; H04L 2012/5632; H04L 47/70
USPC .................................................. 709/223, 226
See application file for complete search history.

(56) References Cited

U.S. PATENT DOCUMENTS 7,299,255 B2 * 11/2007 Tenorio .......................... 709/201
8,341,626 B1 * 12/2012 Gardner et al. .................... 718/1
2008/0080396 A1 4/2008 Meijer et al.
2010/0050172 A1 2/2010 Ferris
2010/0076856 A1 3/2010 Mullins
(Continued)

OTHER PUBLICATIONS

Mell et al., "The NIST Definition of Cloud Computing", National Institute of Standards and Technology, Information Technology Laboratory, Version 15, Oct. 7, 2009, 2 pages.
(Continued)

*Primary Examiner* — Phuoc Nguyen
(74) *Attorney, Agent, or Firm* — Noah A. Sharkan; Hunter E. Webb; Keohane & D'Alessandro PLLC (57) ABSTRACT

Embodiments of the present invention provide an approach for dynamically relocating a set of workloads among geographic regions of a networked computing environment (e.g., a cloud computing environment) based on infrastructure/computing resource needs. In a typical embodiment, it is determined whether a first geographic region of the networked computing environment has a first set of computing resources with an available capacity that meets a needed capacity for handling a set of workloads that is initially associated with the first geographic region. If not, a second geographic region of the networked computing environment having a second set of computing resources with the needed capacity is identified. In general, this determination can be made based upon multiple factors such as: a set of performance requirements, stored in at least one computer data structure, needed to handle the set of workloads; a set of environmental parameters, stored in the at least one computer data structure, having a potential to affect the handling of the set of workloads; and/or a set of cost parameters, stored in the at least one computer data structure, associated with handling the set of workloads. Once the second geographic region has been identified, the set of workloads can be associated with and handled thereby.

22 Claims, 5 Drawing Sheets

(56) References Cited

U.S. PATENT DOCUMENTS

| | | | |
|---|---|---|---|
| 2011/0023048 A1* | 1/2011 | Srinivasan | 718/105 |
| 2011/0055398 A1 | 3/2011 | Dehaan et al. | |
| 2011/0137805 A1 | 6/2011 | Brookbanks et al. | |
| 2011/0138048 A1 | 6/2011 | Dawson et al. | |
| 2011/0145094 A1 | 6/2011 | Dawson et al. | |
| 2011/0153727 A1 | 6/2011 | Li | |
| 2012/0297238 A1* | 11/2012 | Watson et al. | 714/4.11 |
| 2012/0310765 A1* | 12/2012 | Masters | 705/26.3 |

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

* cited by examiner

DYNAMICALLY RELOCATING WORKLOADS IN A NETWORKED COMPUTING ENVIRONMENT

TECHNICAL FIELD

In general, the present invention relates to computing resource optimization. Specifically, the present invention relates to the dynamic geographic relocation of workloads in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Presently, many networked computing services (e.g., cloud computing services) are provided through infrastructure provisioning (e.g., within a relatively static hardware pool) whereby operating systems and computer software applications can be deployed and reconfigured. In a typical cloud computing environment, application images can be installed and overwritten, Internet Protocol (IP) addresses can be modified, and real and virtual processors are allocated to meet changing resource requirements. However, challenges can exist in that cloud computing environments are typically static entities whose infrastructures are fully managed. As such, optimization of the cloud computing environments typically occurs through standard acquisition and installation of new hardware and/or other resources. Such an approach may be inefficient and/or not economically viable.

SUMMARY

Embodiments of the present invention provide an approach for dynamically relocating a set of workloads among geographic regions of a networked computing environment (e.g., a cloud computing environment) based on infrastructure/computing resource needs. In a typical embodiment, it is determined whether a first geographic region of the networked computing environment has a first set of computing resources with an available capacity that meets a needed capacity for handling a set of workloads that is initially associated with the first geographic region. If not, a second geographic region of the networked computing environment having a second set of computing resources with the needed capacity is identified. In general, this determination can be made based upon multiple factors such as: a set of performance requirements, stored in at least one computer data structure, needed to handle the set of workloads; a set of environmental parameters, stored in the at least one computer data structure, having a potential to affect the handling of the set of workloads; and/or a set of cost parameters, stored in the at least one computer data structure, associated with handling the set of workloads. Once the second geographic region has been identified, the set of workloads can be associated with and handled thereby.

A first aspect of the present invention provides a computer-implemented method for dynamically relocating a set of workloads in a networked computing environment, comprising: determining whether a first geographic region of the networked computing environment has a first set of computing resources with an available capacity that meets a needed capacity for handling the set of workloads that is initially associated with the first geographic region; identifying, responsive to the needed capacity exceeding the available capacity, a second geographic region of the networked computing environment having a second set of computing resources with the needed capacity, the determination of whether the first set of computing resources has the needed resources and the identification of the second geographic region being based on at least one of the following: a set of performance requirements, stored in at least one computer data structure, needed to handle the set of workloads, a set of environmental parameters, stored in the at least one computer data structure, having a potential to affect the handling of the set of workloads, or a set of cost parameters, stored in the at least one computer data structure, associated with handling the set of workloads; and handling the set of workloads in the second geographic region.

A second aspect of the present invention provides a system for dynamically relocating a set of workloads in a networked computing environment, comprising: a memory medium comprising instructions; a bus coupled to the memory medium; and a processor coupled to the bus that when executing the instructions causes the system to: determine whether a first geographic region of the networked computing environment has a first set of computing resources with an available capacity that meets a needed capacity for handling the set of workloads that is initially associated with the first geographic region; identify, responsive to the needed capacity exceeding the available capacity, a second geographic region of the networked computing environment having a second set of computing resources with the needed capacity, the determination of whether the first set of computing resources has the needed resources and the identification of the second geographic region being based on at least one of the following: a set of performance requirements, stored in at least one computer data structure, needed to handle the set of workloads, a set of environmental parameters, stored in the at least one computer data structure, having a potential to affect the handling of the set of workloads, or a set of cost parameters, stored in the at least one computer data structure, associated with handling the set of workloads; and handle the set of workloads in the second geographic region.

A third aspect of the present invention provides a computer program product for dynamically relocating a set of workloads in a networked computing environment, the computer program product comprising a computer readable storage media, and program instructions stored on the computer readable storage media, to: determine whether a first geographic region of the networked computing environment has a first set of computing resources with an available capacity that meets a needed capacity for handling the set of workloads that is initially associated with the first geographic region; identify, responsive to the needed capacity exceeding the available capacity, a second geographic region of the networked computing environment having a second set of computing resources with the needed capacity, the determination of whether the first set of computing resources has the needed resources and the identification of the second geographic region being based on at least one of the following: a set of performance requirements, stored in at least one computer data structure, needed to handle the set of workloads, a set of environmental parameters, stored in the at least one computer data structure, having a potential to affect the handling of the set of workloads, or a set of cost parameters, stored in the at least one computer data structure associated, with handling the set of workloads; and handle the set of workloads in the second geographic region.

A fourth aspect of the present invention provides a method for deploying a system for dynamically optimizing computing resources in a networked computing environment, comprising: providing a computer infrastructure being operable to: determine whether a first geographic region of the networked computing environment has a first set of computing resources with an available capacity that meets a needed capacity for handling a set of workloads that is initially associated with the first geographic region; identify, responsive to the needed capacity exceeding the available capacity, a second geographic region of the networked computing environment having a second set of computing resources with the needed capacity, the determination of whether the first set of computing resources has the needed resources and the identification of the second geographic region being based on at least one of the following: a set of performance requirements, stored in at least one computer data structure, needed to handle the set of workloads, a set of environmental parameters, stored in the at least one computer data structure, having a potential to affect the handling of the set of workloads, or a set of cost parameters, stored in the at least one computer data structure, associated with handling the set of workloads; and handle the set of workloads in the second geographic region.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for dynamically relocating a set of workloads among geographic regions of a networked computing environment (e.g., a cloud computing environment) based on infrastructure/computing resource needs. In a typical embodiment, it is determined whether a first geographic region of the networked computing environment has a first set of computing resources with an available capacity that meets a needed capacity for handling a set of workloads that is initially associated with the first geographic region. If not, a second geographic region of the networked computing environment having a second set of computing resources with the needed capacity is identified. In general, this determination can be made based upon multiple factors such as: a set of performance requirements, stored in at least one computer data structure, needed to handle the set of workloads; a set of environmental parameters, stored in the at least one computer data structure, having a potential to affect the handling of the set of workloads; and/or a set of cost parameters, stored in the at least one computer data structure, associated with handling the set of workloads. Once the second geographic region has been identified, the set of workloads can be associated with and handled thereby.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
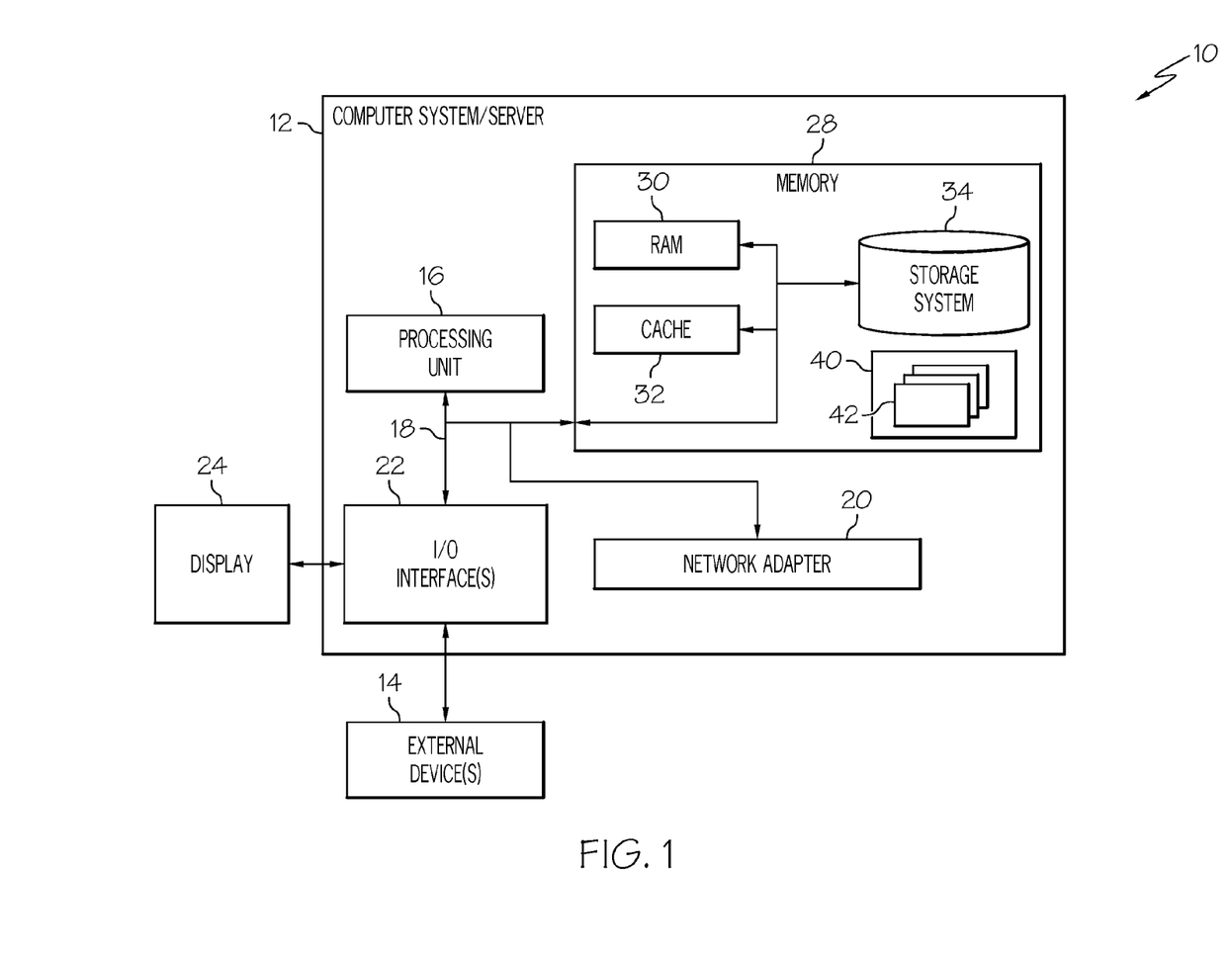
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
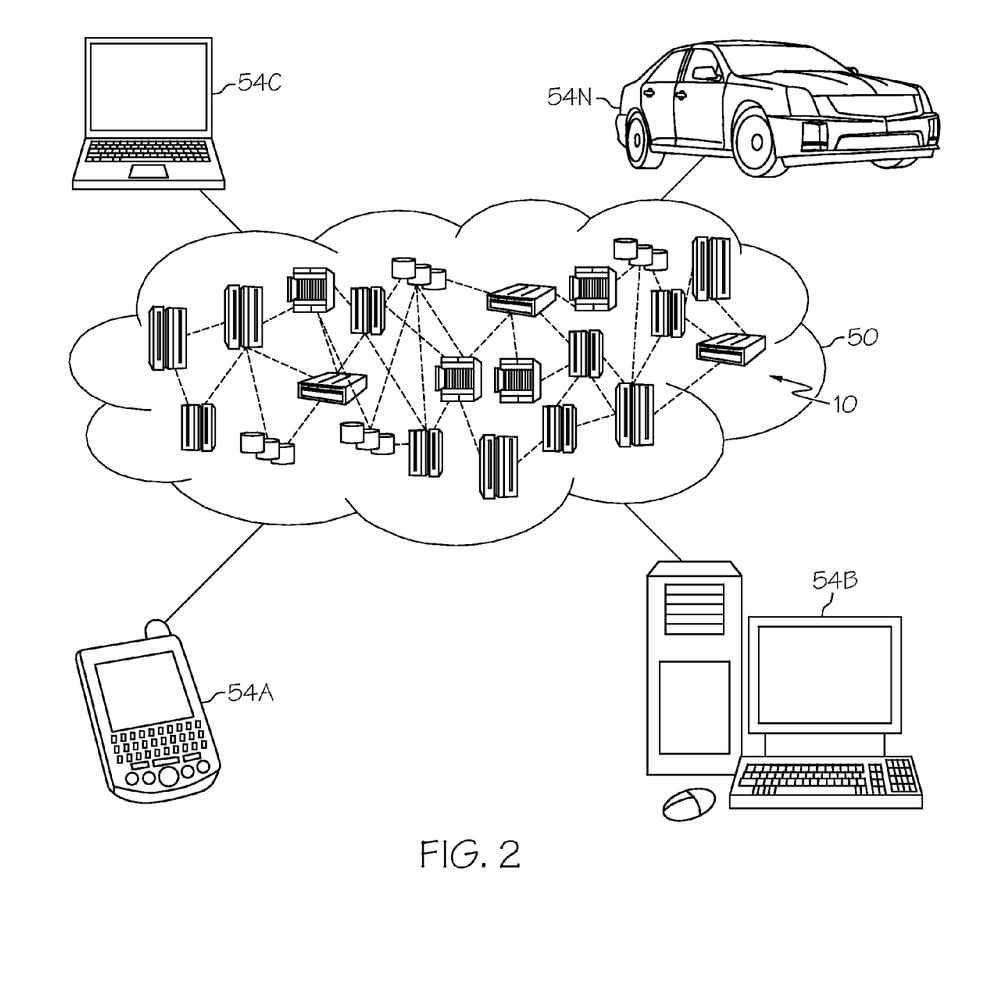
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
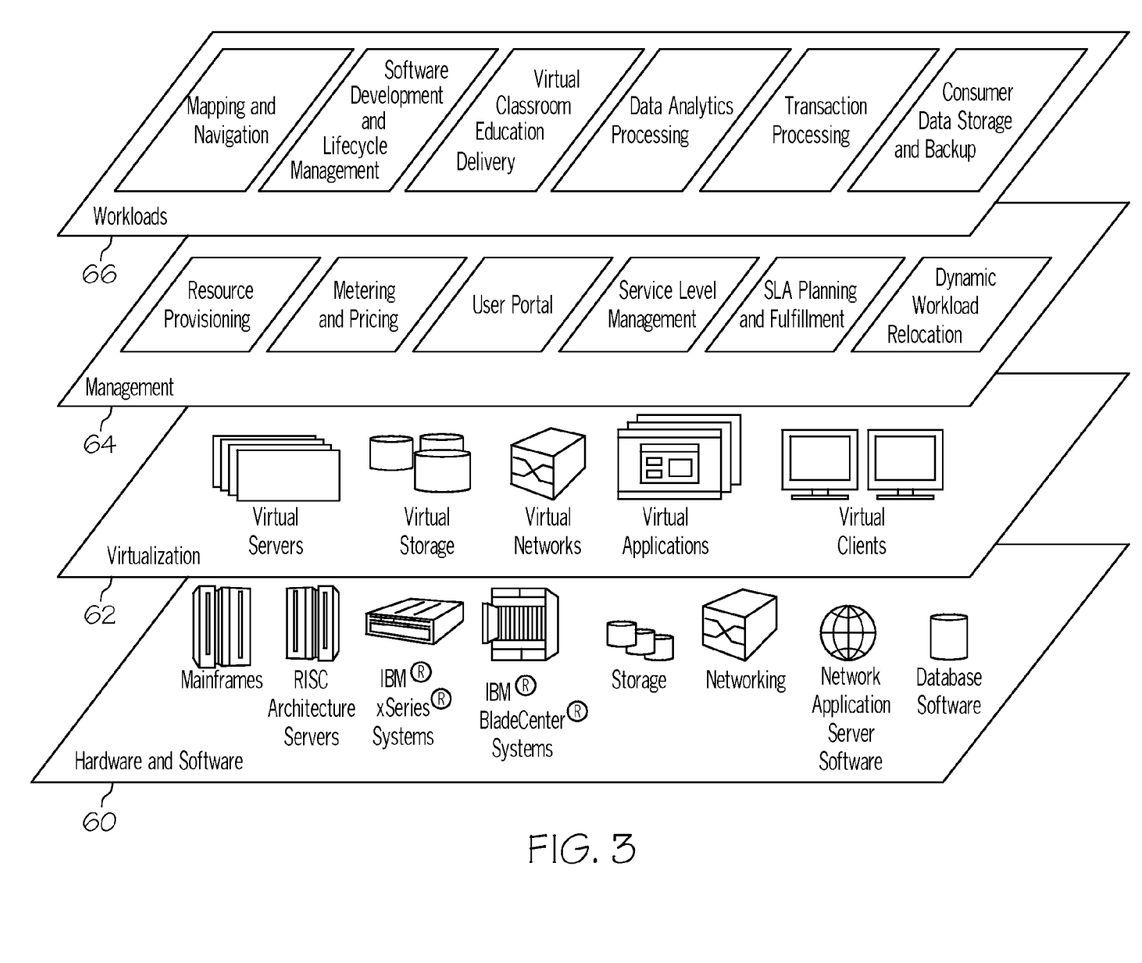
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is dynamic workload relocation function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the dynamic workload relocation functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
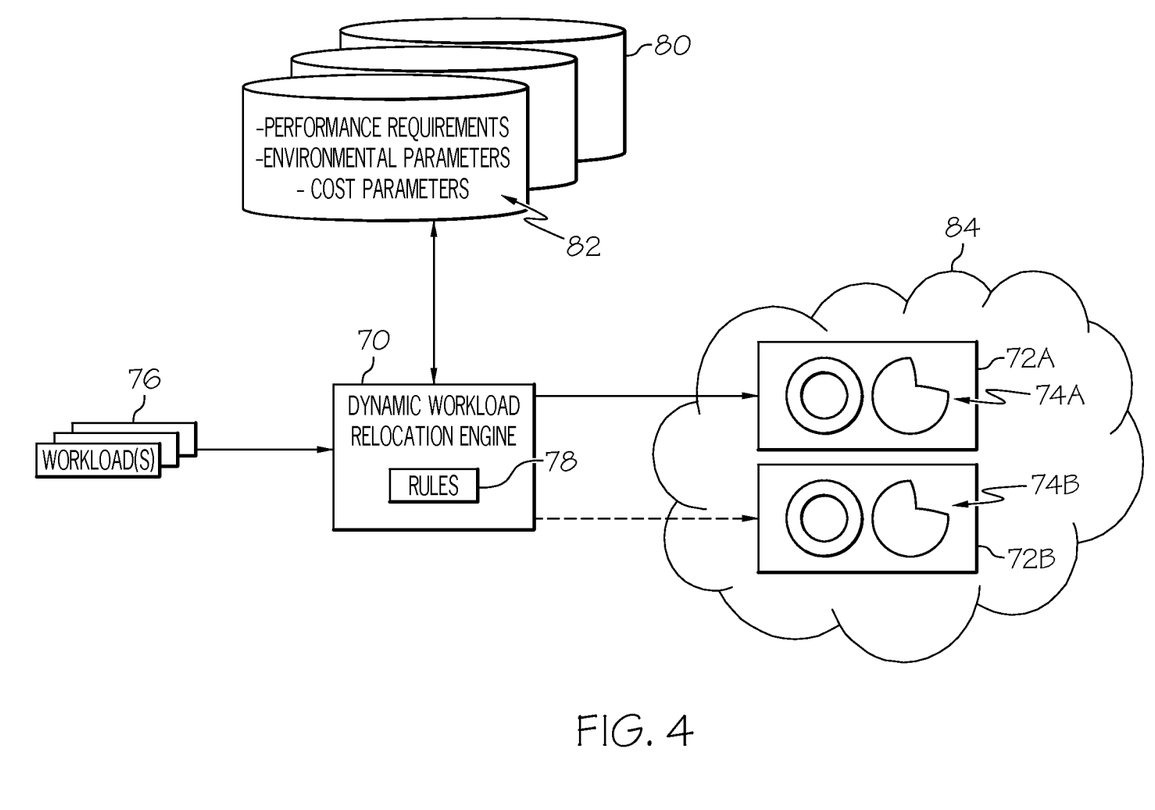
FIG. 4 depicts a system diagram according to an embodiment of the present invention.

As indicated above, embodiments of the present invention provide an approach for dynamically relocating workload(s) among geographic regions of a cloud environment to meet demands and/or computing resource needs/capacities. A system diagram according to an aspect of the present invention is shown in FIG. 4. As depicted, a dynamic workload relocation engine (engine 70) is depicted. In general, engine 70 can be implemented as program 40 on computer system 12 of FIG. 1 and can implement the functions recited herein as depicted in management layer 64 of FIG. 3. In general, engine 70 comprises a rules engine that processes a set (at least one) of rules 78 and weighs a set of factors 82 (stored on a set of computer data structures 80) to determine whether to relocate a set of workloads 76 from a first geographic region (region 72A) to a second geographic region (region 72B) based on available capacities of region 72A-B's respective computing resources 74A-B (computer hardware and/or software). It is understood that although regions 72A-B are shown within a single cloud environment 84, this need not be the case. Rather, regions 74A-B could be distributed among two or more cloud environments.

Regardless, set of rules 78 can provide multiple approaches for determining whether workloads need to be relocated/reassigned to a different geographic region. These methods will utilize factors 82 such as performance requirements, environmental parameters, and/or cost parameters. Illustrative methods contained describing how set of rules 78 can weigh factors 82 are described below:

Performance Requirements:

In this method, the cloud environment is optimized based on present and future performance needs. Consumer location is determined via transaction analysis. If the majority of consumers are located within a single geographic region (e.g., region 72A), engine 78 may expand and/or shift away from that region to better serve the consumers. This approach need not be a one-time "static shift", but may move a cloud environment instance between various cloud environments as the consumers' locations change. In another embodiment, predictive shifting may be implemented. For example, an analysis may show that a common daily pattern of usage emerges in which the majority of use follows a certain time of day (e.g., as such, the instances may be migrated on a schedule based on estimated usage patterns for the next 24 hours).

Environmental Parameters:

This method analyzes potentially harmful weather conditions (e.g., excessive heat, hurricanes, tornados, floods, etc.) or other environmental parameters (e.g., impending power outages, solar flares, etc. which could exceed the ability of back-up supplies to run required systems) in cloud provider locations that may necessitate an automatic movement from one cloud provider to another. The analysis may be based on national weather service warnings, or via manual inputs. In one embodiment, automatic parsing of national weather service warnings occurs. If the probability threshold of a disaster or other disruptive event exceeds a specific threshold/level, automatic movement procedures within a cloud environment are invoked. In another embodiment, if the potential for disruption that may be caused by the event exceeds a threshold, appropriate resources are contacted to evaluate if a migration is required. Migration priority may be established based on several criteria such as customer size, instances running in other geographic areas, deployment time, etc.

It is noted that in at least one scenario, servers/virtual machines (VMs) at geographic locations that have been "evacuated" may continue to be operational for some period of time before they are taken off-line. In this scenario, engine 70 would find noncritical workloads to migrate to that portion of the cloud environment. Workloads can be considered to be "noncritical" when, if the servers go down permanently or temporarily, the business consequences are not unduly adverse. An analysis performed there under would conversely also consider how much power savings would occur if that data center "went dark" and powered down. This embodiment would also allow the data center owner (cloud environment owner) to resell VM time at a discounted rate for a set period of time.

Cost Optimization:

In this method, geographic selection may be initiated by cost. Specifically, this approach examines the consideration that instances contained within an existing cloud environment and/or region infrastructure might best be re-provisioned to other cloud environments and/or regions if doing so will be more fiscally beneficial than running on the local cloud environment infrastructure. For example, some infrastructure/resource providers may wish to sell capacity at a reduced rate if they have excess capacity available. When that occurs, the infrastructure/resource providers may notify the cloud environment providers of the reduced usage cost, as well as the duration for which that cost is offered. At this point, engine 70 may select to relocate some instances of workloads to reduce the total operating cost of the cloud environment. In an additional consideration to allow for greater economic benefits, an application owner might agree to let their application be "movable" or "permanent." If the application owners agree to let the cloud environment providers migrate the owners' application to other locations, the application owners could receive discounts or a percentage of the profit the cloud environment providers achieved by migrating the job. Conversely, some application owners might want their job permanently anchored to a given infrastructure (e.g., for testing latency between geographic regions 74A-B, data security concerns, etc.).

Figure 5:
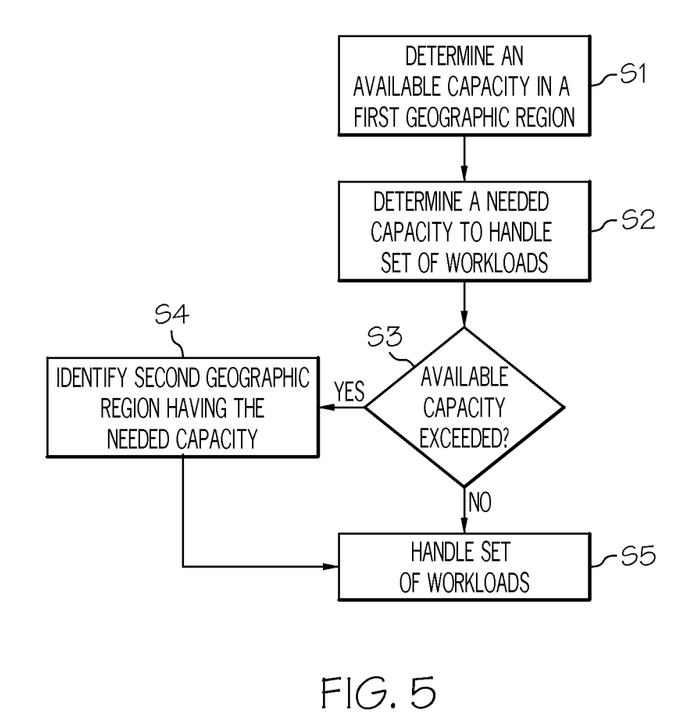
FIG. 5 depicts a method flow diagram according to an embodiment of the present invention.

Referring now to FIG. 5, a method flow diagram according to an embodiment of the present invention is shown. In step S1, an available capacity of a set of computing resources in a first geographic region of a networked computing environment is determined. In step S2, a capacity needed (i.e., a "needed capacity") for processing a set of workloads that is initially associated with the first geographic region is determined. In step S3, it will be determined whether the needed capacity exceeds the available capacity. If not, the workloads can be handled/processed in the first geographic region in step S5. If, however, the needed capacity exceeds the available capacity, a second geographic region (i.e., having the needed capacity) will be identified in step S4. As indicated above, the second geographic region can be identified based upon multiple approaches. Such approaches may be based upon: a set of performance requirements stored in the at least one computer data structure needed to handle the set of workloads; a set of environmental parameters stored in the at least one computer data structure having a potential to affect the handling of the set of workloads; and/or a set of cost parameters stored in the at least one computer data structure associated with handling the set of workloads. Once a capable second geographic region is identified, the workload can be associated with and handled therein in step S5.

While shown and described herein as a workload relocation solution, it is understood that the invention further provides various alternative embodiments. For example, in one embodiment, the invention provides a computer-readable/useable medium that includes computer program code to enable a computer infrastructure to provide workload relocation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide workload relocation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for workload relocation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for dynamically relocating a set of workloads in a networked computing environment, comprising:
   determining, in a networked computing environment in which workloads are allocated to computing resources based on a location of a consumer associated with a particular workload within a particular geographic region, whether a first geographic region of the networked computing environment has a first set of computing resources with an available capacity that meets a needed capacity for handling the set of workloads that is initially associated with the first geographic region;
   identifying, responsive to the needed capacity exceeding the available capacity, a second geographic region of the networked computing environment, which is less proximate to the consumer, having a second set of computing resources with the needed capacity, the determination of whether the first set of computing resources has the needed resources and the identification of the second geographic region being based on the following: a set of performance requirements, stored in at least one computer data structure, needed to handle the set of workloads; a set of environmental parameters, including a number of potentially harmful weather conditions and power disturbances from an automatic parsing of national weather service warnings exceeding a predetermined threshold, stored in the at least one computer data structure, having a potential to affect the handling of the set of workloads; and a set of cost parameters, stored in the at least one computer data structure, associated with handling the set of workloads; and
   handling the set of workloads in the second geographic region.

2. The computer-implemented method of claim 1, further comprising determining a location of a consumer associated with the set of workloads, the location corresponding to the first geographic region.

3. The computer-implemented method of claim 2, the determining of the location comprising performing an analysis of transactions associated with the networked computing environment.

4. The computer-implemented method of claim 1, the environmental parameters corresponding to at least one weather event.

5. The computer-implemented method of claim 4, the environmental parameters comprising a probability threshold that the weather event will have the potential to affect the handling of the set of workloads.

6. The computer-implemented method of claim 5, further comprising determining if the probability threshold exceeds a predetermined limit.

7. The computer-implemented method of claim 1, the networked computing environment comprising a cloud computing environment.

8. A system for dynamically relocating a set of workloads in a networked computing environment, comprising:
 a memory medium comprising instructions;
 a bus coupled to the memory medium; and
 a processor coupled to the bus that when executing the instructions causes the system to:
  determine, in a networked computing environment in which workloads are allocated to computing resources based on a location of a consumer associated with a particular workload within a particular geographic region, whether a first geographic region of the networked computing environment has a first set of computing resources with an available capacity that meets a needed capacity for handling the set of workloads that is initially associated with the first geographic region;
  identify, responsive to the needed capacity exceeding the available capacity, a second geographic region of the networked computing environment, which is less proximate to the consumer, having a second set of computing resources with the needed capacity, the determination of whether the first set of computing resources has the needed resources and the identification of the second geographic region being based on the following: a set of performance requirements, stored in at least computer data structure, needed to handle the set of workloads; a set of environmental parameters, including a number of potentially harmful weather conditions and power disturbances from an automatic parsing of national weather service warnings exceeding a predetermined threshold, stored in the at least one computer data structure, having a potential to affect the handling of the set of workloads; and a set of cost parameters, stored in the at least one computer data structure, associated with handling the set of workloads; and
  handle the set of workloads in the second geographic region.

9. The system of claim 8, the memory medium further comprising instructions for causing the system to determine a location of a consumer associated with the set of workloads, the location corresponding to the first geographic region.

10. The system of claim 9, the memory medium further comprising instructions for causing the system to perform an analysis of transactions associated with the networked computing environment.

11. The system of claim 8, the environmental parameters corresponding to at least one weather event.

12. The system of claim 11, the environmental parameters comprising a probability threshold that the weather event will have the potential to affect the handling of the set of workloads.

13. The system of claim 12, the memory medium further comprising instructions for causing the system to determine if the probability threshold exceeds a predetermined limit.

14. The system of claim 8, the networked computing environment comprising a cloud computing environment.

15. A computer program product for dynamically relocating a set of workloads in a networked computing environment, the computer program product comprising a computer readable storage device, and program instructions stored on the computer readable storage media, to:
 determine, in a networked computing environment in which workloads are allocated to computing resources based on a location of a consumer associated with a particular workload within a particular geographic region, whether a first geographic region of the networked computing environment has a first set of computing resources with an available capacity that meets a needed capacity for handling the set of workloads that is initially associated with the first geographic region;
 identify, responsive to the needed capacity exceeding the available capacity, a second geographic region of the networked computing environment, which is less proximate to the consumer, having a second set of computing resources with the needed capacity, the determination of whether the first set of computing resources has the needed resources and the identification of the second geographic region being based on the following: a set of performance requirements, stored in at least one computer data structure, needed to handle the set of workloads; a set of environmental parameters, including a number of potentially harmful weather conditions and power disturbances from an automatic parsing of national weather service warnings exceeding a predetermined threshold, stored in the at least one computer data structure, having a potential to affect the handling of the set of workloads; and a set of cost parameters, stored in the at least one computer data structure, associated with handling the set of workloads; and
 handle the set of workloads in the second geographic region.

16. The computer program product of claim 15, the computer readable storage media further comprising instructions to determine a location of a consumer associated with the set of workloads, the location corresponding to the first geographic region.

17. The computer program product of claim 16, the computer readable storage media further comprising instructions to perform an analysis of transactions associated with the networked computing environment.

18. The computer program product of claim 15, the environmental parameters corresponding to at least one weather event.

19. The computer program product of claim 18, the environmental parameters comprising a probability threshold that the weather event will have the potential to affect the handling of the set of workloads.

20. The computer program product of claim 19, the computer readable storage media further comprising instructions to determine if the probability threshold exceeds a predetermined limit.

21. The computer program product of claim 15, the networked computing environment comprising a cloud computing environment.

22. A method for deploying a system for dynamically optimizing computing resources in a networked computing environment, comprising:
 providing a computer infrastructure being operable to:
  determine, in a networked computing environment in which workloads are allocated to computing resources based on a location of a consumer associated with a particular workload within a particular geographic region, whether a first geographic region of the networked computing environment has a first set of computing resources with an available capacity that meets a needed capacity for handling the set of workloads that is initially associated with the first geographic region;

identify, responsive to the needed capacity exceeding the available capacity, a second geographic region of the networked computing environment, which is less proximate to the consumer, having a second set of computing resources with the needed capacity, the determination of whether the first set of computing resources has the needed resources and the identification of the second geographic region being based on the following: a set of performance requirements stored, in at least one computer data structure, needed to handle the set of workloads; a set of environmental parameters, including a number of potentially harmful weather conditions and power disturbances from an automatic parsing of national weather service warnings exceeding a predetermined threshold, stored in the at least one computer data structure, having a potential to affect the handling of the set of workloads; and a set of cost parameters, stored in the at least one computer data structure, associated with handling the set of workloads; and handle the set of workloads in the second geographic region.

* * * * *